US009331330B2

(12) United States Patent
El-Ashry et al.

(10) Patent No.: US 9,331,330 B2
(45) Date of Patent: May 3, 2016

(54) COMPOSITE ANODE STRUCTURE FOR HIGH ENERGY DENSITY LITHIUM-ION BATTERIES

(75) Inventors: Mostafa M. El-Ashry, Elmsford, NY (US); Osama Tobail, Elmsford, NY (US); George S. Tulevski, White Plains, NY (US)

(73) Assignees: International Business Machines Corporation, Armonk, NY (US); Egypt Nanotechnology Center (EGNC), Giza Governorate (EG)

( * ) Notice: Subject to any disclaimer, the term of this patent is extended or adjusted under 35 U.S.C. 154(b) by 0 days.

(21) Appl. No.: 13/302,576

(22) Filed: Nov. 22, 2011

(65) Prior Publication Data

US 2013/0130077 A1 May 23, 2013

(51) Int. Cl.
| | |
|---|---|
| H01M 4/134 | (2010.01) |
| H01M 4/75 | (2006.01) |
| H01M 4/1395 | (2010.01) |
| H01M 10/0525 | (2010.01) |
| H01M 4/66 | (2006.01) |
| H01M 4/70 | (2006.01) |
| B82Y 30/00 | (2011.01) |

(52) U.S. Cl.
CPC ............ *H01M 4/1395* (2013.01); *H01M 4/134* (2013.01); *H01M 4/661* (2013.01); *H01M 4/663* (2013.01); *H01M 4/667* (2013.01); *H01M 4/70* (2013.01); *B82Y 30/00* (2013.01); *H01M 10/0525* (2013.01); *Y02E 60/122* (2013.01)

(58) Field of Classification Search
USPC ............................................. 429/322, 215, 66
See application file for complete search history.

(56) References Cited

U.S. PATENT DOCUMENTS

| | | | | |
|---|---|---|---|---|
| 6,921,463 | B2 * | 7/2005 | Sayama et al. | 204/192.12 |
| 7,407,520 | B2 | 8/2008 | Farahmandi et al. | |
| 7,754,382 | B2 * | 7/2010 | Kurihara et al. | 429/218.1 |
| 8,450,012 | B2 * | 5/2013 | Cui et al. | 429/209 |
| 8,481,158 | B2 * | 7/2013 | Nakayama et al. | 428/367 |
| 2010/0099029 | A1 | 4/2010 | Kinoshita et al. | |
| 2011/0086294 | A1 | 4/2011 | Xiao et al. | |
| 2011/0111283 | A1 * | 5/2011 | Rust et al. | 429/163 |

FOREIGN PATENT DOCUMENTS

WO    WO2010087903    * 12/2009

OTHER PUBLICATIONS

International Search Report and Written Opinion for International Application No. PCT/US12/66289, mailed Jan. 31, 2013. (8 pages).

(Continued)

*Primary Examiner* — Ula C Ruddock
*Assistant Examiner* — Thomas Parsons
(74) *Attorney, Agent, or Firm* — Tutunjian & Bitetto, P.C.; Louis J. Percello (57) ABSTRACT

An electrode includes a conductive substrate and a plurality of conductive structures providing a compressible matrix of material. An active material is formed in contact with the plurality of conductive structures. The active material includes a volumetrically expanding material which expands during ion diffusion such that the plurality of conductive structures provides support for the active material and compensates for volumetric expansion of the active material to prevent damage to the active material.

28 Claims, 6 Drawing Sheets

(56) References Cited

OTHER PUBLICATIONS

Cui, L., et al. "Crystalline-Amorphous Core-Shell Silicon Nanowires for High Capacity and High Current Battery Electrodes" Nano Letters, vol. 9, No. 1. Dec. 2008. pp. 491-495.

Zhang, J., et al. "Silicon Nanowire Reinforced by Single-Walled Carbon Nanotube and Its Applications to Anti-Pulverization Electrode in Lithium Ion Battery" Composites Part B: Engineering, vol. 43, Issue 1. Nanomechanics and Nanocomposites: Mechanical Behaviors . Jan. 2012. pp. 76-82.

* cited by examiner

COMPOSITE ANODE STRUCTURE FOR HIGH ENERGY DENSITY LITHIUM-ION BATTERIES

BACKGROUND

1. Technical Field

The present invention relates to battery devices, and more particularly to composite structures for batteries which improve capacity and performance.

2. Description of the Related Art

Exponential growth in portable electronic devices such as cellular phones and laptop computers during the past decade has created enormous interest in compact, light-weight batteries offering high energy densities. Growing environmental concerns are driving the development of advanced batteries for electric vehicles and devices. Lithium-ion batteries provide higher energy density compared with other rechargeable battery systems such as lead-acid, nickel-cadmium and nickel-metal hydride batteries. Commercial lithium-ion (Li-ion) batteries use graphite as an anode. Graphite displays a maximum capacity of C=372 mAh/g. Other materials such as carbon nanotubes, Ge nanowires, coaxial MnO/carbon nanotube arrays, etc. may also be employed.

Silicon as an anode for Li-ion batteries has the highest capacity of C=4212 mAh/g. One problem associated with silicon usage is that the silicon volume increases by 400% after $Li^+$ insertion. The volume increase results in silicon pulverization and hence loss in the electrical contact between the active material and the current collector. Therefore, silicon electrodes lead to batteries with high capacity in initial charging/discharging cycles and then the capacity decreases, and the battery exhibits low lifetime.

SUMMARY

An electrode includes a conductive substrate and a plurality of conductive structures providing a compressible matrix of material. An active material is formed in contact with the plurality of conductive structures. The active material includes a volumetrically expanding material which expands during ion diffusion such that the plurality of conductive structures provides support for the active material and compensates for volumetric expansion of the active material to prevent damage to the active material.

A method for forming a battery electrode includes forming conductive structures on a conductive substrate, the conductive structures being formed from a compressible matrix of material; depositing a base material on the conductive structures; processing the base material to form an active material on the conductive structures such that the base material undergoes a volumetric expansion; and compensating for the volumetric expansion using the matrix of compressible material provided by the conductive structures.

Another method for forming a battery electrode includes forming a conductive layer on a conductive substrate, the conductive layer being formed from a compressible matrix of material; depositing a base material on the conductive layer; processing the base material to form an active material on the conductive layer such that the base material undergoes a volumetric expansion; and compensating for the volumetric expansion using the matrix of compressible material provided by the conductive layer.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, higher capacity materials are provided based on composites. The present embodiments avoid fracture and pulverization of materials, such as, e.g., with silicon after $Li^+$ intercalation due to volume increase. In addition, methods for material optimization are provided, which use only a desired amount of a material (e.g., Si) to get a highest theoretical capacity and avoid non-useful amounts of material which simply add to battery weight and hence reduce apparent mAh/g.

In one particularly useful embodiment, a controlled amount of silicon containing thin film (e.g., amorphous silicon) is deposited on conductive columns, which are grown or patterned on a conductive substrate. The columns are preferably configured to relax strain resulting from silicon film volume increase after lithium insertion. The columns can contain bundles of, e.g., Cu or other metal nanowires, carbon nanotubes, etc. The columns provide conduction to permit efficient current flow to the conducting substrate. The columns also enable high surface contact between the silicon and the lithium in an electrolyte due to a larger surface area. Amorphous silicon and/or other silicon containing active material is deposited for lithium ion battery anodes in a system which enables a balance of a volume increase after lithiation by adding another material to the system which can afford high volume elastic compression. This feature can be implemented in vertical columns or laminated layers (stacking).

In one embodiment, a vertical column structure is implemented by depositing a controlled amount of amorphous silicon or other material including silicon in the form of a thin film to cover a patterned micro- or nano-structure of columns grown on a conductive substrate. Each column can be "spongy" to balance the silicon volume increase after lithium intercalation, with minimized increase in the pressure of an electrolyte. In a laminated structure, spongy layers are needed to accommodate volume change. In another embodiment, laminated layers are employed to build a stacked multi-layer system of amorphous silicon (a-Si) and carbon nanotubes (CNT) which also balance the silicon volume increase after lithium intercalation by the compression of the CNT layer. CNT can withstand very high elastic compression. Examples of spongy materials include, e.g., porous silicon, porous metals (e.g., copper), graphite/porous graphite, single/multiwall carbon nanotubes, etc.

It is to be understood that the present invention will be described in terms of a given illustrative architecture for use in high density batteries; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A design for a battery device may be created for integrated circuit integration, employed in an electronic device or combined with components on a printed circuit board. The circuit board including the battery may be embodied in a graphical computer programming language, and stored in a computer storage medium (such as a disk, tape, physical hard drive, or virtual hard drive such as in a storage access network). The designer may transmit the resulting design by physical means (e.g., by providing a copy of the storage medium storing the design) or electronically (e.g., through the Internet) directly or indirectly. The stored design is then converted into the appropriate format (e.g., GDSII) for the fabrication of device or related fabrication masks, such as photolithographic masks which are utilized to define areas to be etched or otherwise processed.

Methods as described herein may be used in the fabrication of battery devices and/or integrated circuits with battery devices. The resulting devices can be affixed to a motherboard or other higher level carrier or placed in a single or multichip package. In any case the devices are then integrated with other chips, discrete circuit elements, and/or other signal processing devices as part of either (a) an intermediate product, such as a motherboard, or (b) an end product. The end product can be any product that includes integrated circuit chips, ranging from toys, energy collectors, solar devices and other applications including computer products or devices having a display, a keyboard or other input device, and a central processor.

Figure 1:
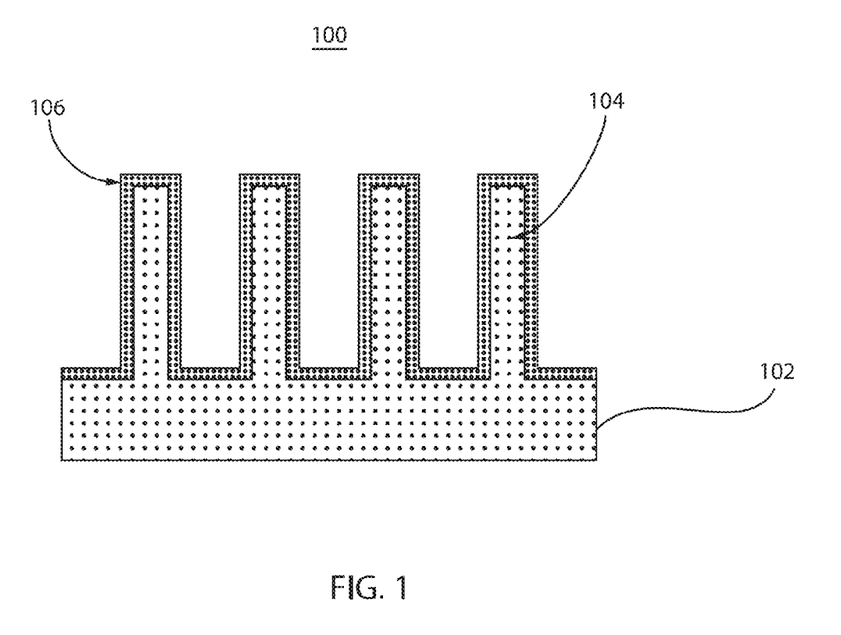
FIG. 1 is a cross-sectional schematic view of a partially fabricated battery anode including a base material formed over a conductive structure (column) in accordance with the present principles.

Referring now to the drawings in which like numerals represent the same or similar elements and initially to FIG. 1, an electrode structure 100 is depicted in accordance with particularly useful embodiments. The electrode structure 100 includes a substrate or substrate layer 102. The substrate or substrate layer 102 preferably includes a conductive material on which columns 104 are formed. The columns 104 may include a solid conductor (with voids), single tubes (e.g., nanotubes) or bundles of nanotubes that are grown or patterned. Silicon nanowires, which may be grown on a silicon substrate, would add to the non-used silicon weight (only the surface and a small thickness of the silicon were Li ions could diffuse would be employed). In attempting to reduce silicon, removing the substrate or portions thereof by etching simply wastes material and adds expense.

In accordance with the present principles, low cost columns 104 are formed on an arbitrary low cost conductive substrate (e.g., Al or Cu) and then the columns 104 are covered, in one example, by an outer layer 106, which may include, e.g., an effective amount of silicon that can react with lithium. The amount of silicon needed to achieve the maximum available capacity separately from other properties is more effectively controlled and the amount of silicon (or other material) use is minimized.

In one embodiment, the columns 104 may be formed by employing a growth process where the columns 104 are grown from the conductive substrate 102 using epitaxial growth from seed sites on the substrate 102. The columns 104 may include the same material or a different material than the substrate 102. In another embodiment, a conductive layer may be formed on the substrate and patterned, or the substrate itself may be patterned. The patterning may include forming a mask on the conductive layer or substrate and etching the conductive layer or substrate 102 to form the columns 104. The masks may include photolithographic masks, solder ball masks, copolymer masks, etc. Other methods may also be employed to form vertical columns 104 including mechanical processing, seeded growth processes, etc.

In one embodiment, vertical columns 104 may be formed by patterning the conductive substrate 102 and then etching pores electrochemically or by plasma methods into the columns 104. This method may include electrochemical etching with or without a mask. The patterning process may employ, e.g., an Alumina mask provided by oxidizing aluminum and then etching pores into the aluminum oxide (alumina). The pores are regular and size-controllable by adjusting the electrochemical etching process parameters. Such masks are available commercially. The mask can cover the substrate (102) surface (preferably Cu) and then Cu is deposited through the pores of the Alumina to form columns or wires 104 after dissolving (etching) the alumina. Void formation in the Cu columns 104 may follow.

In another embodiment, vertical columns may be formed by covering the substrate (102) surface with nucleation sites and then growing the columns 104 by chemical vapor deposition (CVD) or electrochemical deposition. The columns or nanowires 104 can be deposited electrochemically, deposited from the vapor phase or printed. Void formation in the columns 104 may follow in a separate step or be provided during formation of the columns 104.

Figure 2:
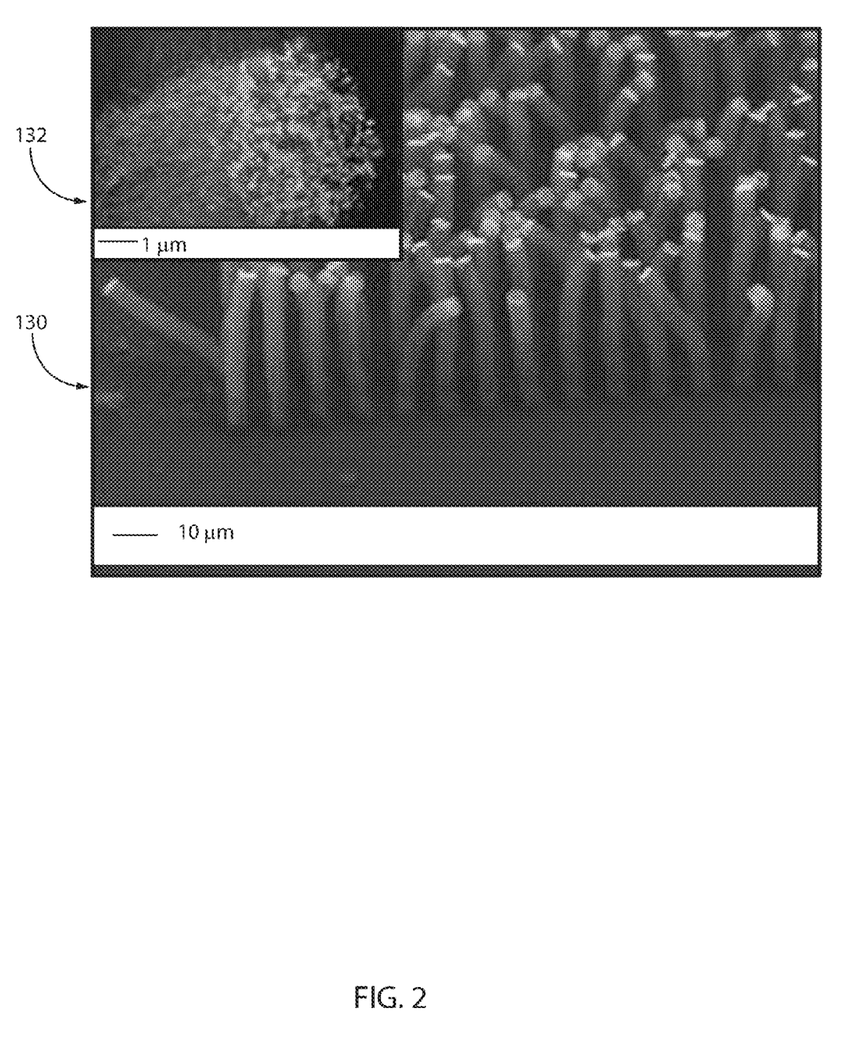
FIG. 2 is a scanning electron microscope image of an array of carbon nanotubes with a further magnified view of a single nanotube showing a bundle of wire structures in accordance with the present principles.

Referring to FIG. 2, an example of single or bundled nanotubes (e.g., carbon nanotubes (CNT)) is illustratively shown in a scanning electron microscope image (SEM). CNT bundle arrays (of about 1 μm in diameter, spaced 5 μm edge-to-edge) are depicted in a main image 130. An inset image 132 shows a magnified view of one of the bundles, containing hundreds of 20 nm-diameter nanotubes. The nanotubes are an example of one form of the columns 104 that may be employed in accordance with the present principles.

Referring again to FIG. 1, grown or patterned columns 104 on the conductive substrate 102 are covered by a base material or outer layer 106. In one embodiment, the base material 106 includes a silicon-containing thin film (e.g., thin film amorphous silicon (a-Si), a-Si with Ge or C, other Si-containing materials, etc.). Other materials for layer 106 may include conductive polymers, nano-particles/conductive polymers containing silicon, such as, silicon hydrates or silicon nano-particles, etc. In still other embodiments, anode materials for outer layer 106 that may be employed with lithium ions may include carbon (e.g., graphite or graphene, single or multi wall carbon nanotubes), hard carbon, lithium titanate ($Li_4Ti_5O_{12}$), germanium, etc.

The material 106 may be deposited on the columns 104 of the structure 100 by a chemical vapor deposition (CVD) process and more preferably by a plasma enhanced CVD (PECVD) process. Deposition of amorphous silicon on single wall carbon nanotubes with optimized parameters does not destroy the tubes. Multi-wall carbon nanotubes have even better plasma resistance and better columnar current conduction. Carbon nanotubes are illustratively shown in FIG. 2.

Figure 3:
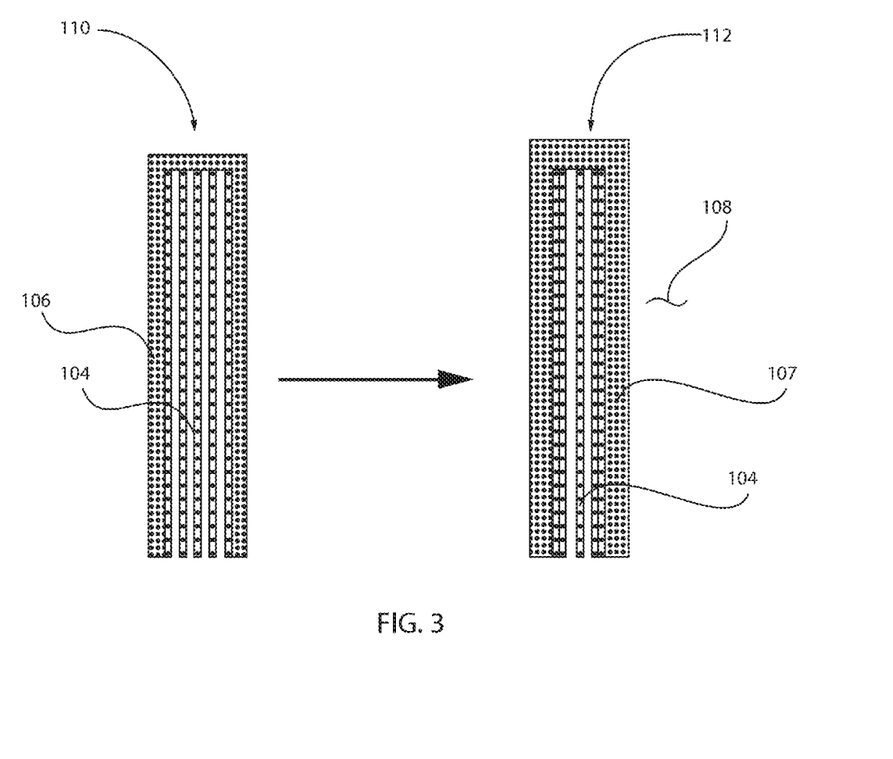
FIG. 3 is a cross-sectional schematic view of the partially fabricated battery anode showing the base material processed thereby increasing its volume which is compensated for by the conductive structure (column) in accordance with the present principles.

Referring to FIG. 3, a diagram schematically shows stress release in the vertical columns. A volume increase in the material 106 does not result in fracture. Instead, the column 104 provides support and is compressed to balance the volume increase. A first structure 110 shows the column 104 with material 106 prior to lithium insertion (lithiation). A second structure 112 shows the column 104 after lithium insertion forming an active material 107. The support and compression balance provided by the column 104 eliminates noticeable silicon fracture when silicon is employed. In addition, the microstructure of the columns 104 of the substrate layer 102 increases a surface area for contacting an electrolyte 108 which surrounds the columns 104 and the substrate layer (102) during the lithiation process and eventually results in increased capacity of the battery compared to planar thin films.

In this example, lithiation takes place in the outer layer 106 of the material within a certain thickness depending on the diffusion coefficient of Li ions into, e.g., silicon and the duration of lithiation. By providing high conductivity and less expensive material such as Cu for columns 104, optimization of the outer layer 106 thickness of silicon in the lithiation process is provided, and the copper core (column 104) remains intact for conductivity and mechanical support. In other words, the column 104 does not need to include bulk silicon, which is expensive and heavy. Instead, a layer is formed on an inexpensive bulk material (Cu), and the benefits of lithiated silicon are still achieved (by silicon-containing layer 106).

There are three components in electrochemical reactions of a lithium-ion battery. These include an anode, a cathode and an electrolyte. Both the anode and the cathode are materials into which, and from which, lithium can migrate. During insertion (intercalation/lithiation) lithium moves into the electrode. During the reverse process, extraction (deintercalation/delithiation), lithium moves back out. When a lithium based cell is discharging, the lithium is extracted from the anode and inserted into the cathode. When the cell is discharging, the reverse occurs. Useful work can only be extracted if electrons flow through a closed external circuit. Taking AM as an anode material and CM as a cathode material, charging will cause the following reactions:

At the cathode: $CM \rightarrow Li_{1-x} + Li^+ + xe^-$
At the anode: $xLi^+ + xe^- + yAM \rightarrow Li_xAM_y$
For Si: $xLi^+ + xe^- + ySi \rightarrow Li_xSi_y$, for the maximum capacity, x=22, y=5.

Figure 4:
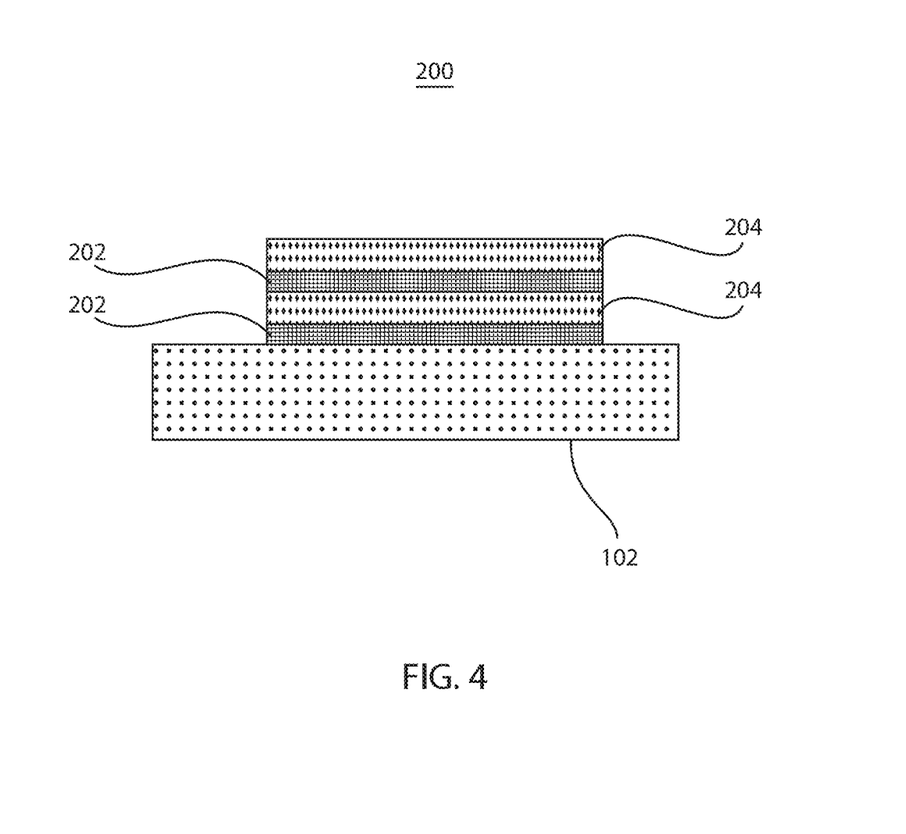
FIG. 4 is a cross-sectional schematic view of a partially fabricated battery anode including a base material formed over a conductive layer in accordance with the present principles.

Referring to FIG. 4, in this embodiment, a structure 200 includes a substrate or substrate layer 102. Material 202 may include deposited layers of conductive material in the form of tubes, bundles of tubes or other compressible matrix of material (e.g., spongy material). The material 202 may include any conductive material that has structure (some rigidity) but remains compressible as described above for columns 104. In one embodiment, carbon nanotubes are employed for material 202. Other materials may also be employed.

A base material 204 is formed on the material 202. The base material 204 may include amorphous silicon, or other silicon-containing material as described above for material 106. Note that the number of layers, their thickness and the order of formation may be varied in accordance with the present principles. Laminated, horizontally stacked layers may continue as desired (see e.g., FIG. 5). Horizontally deposited layers are employed instead of columns in this embodiment, but have the same advantages as the columns (104). These advantages include providing support for compression to balance the volume increase due to the introduction of lithium or other processing. In addition, the layers of material 202 and base material 204 may be formed using simple methods such as dip coating, spray and vacuum filtration, etc. Amorphous silicon may be employed for base material 204, which can be prepared either by PECVD or using these simpler methods (such as silicon evaporation) since there is no need to cover vertical areas as in the case with columns (104).

Figure 5:
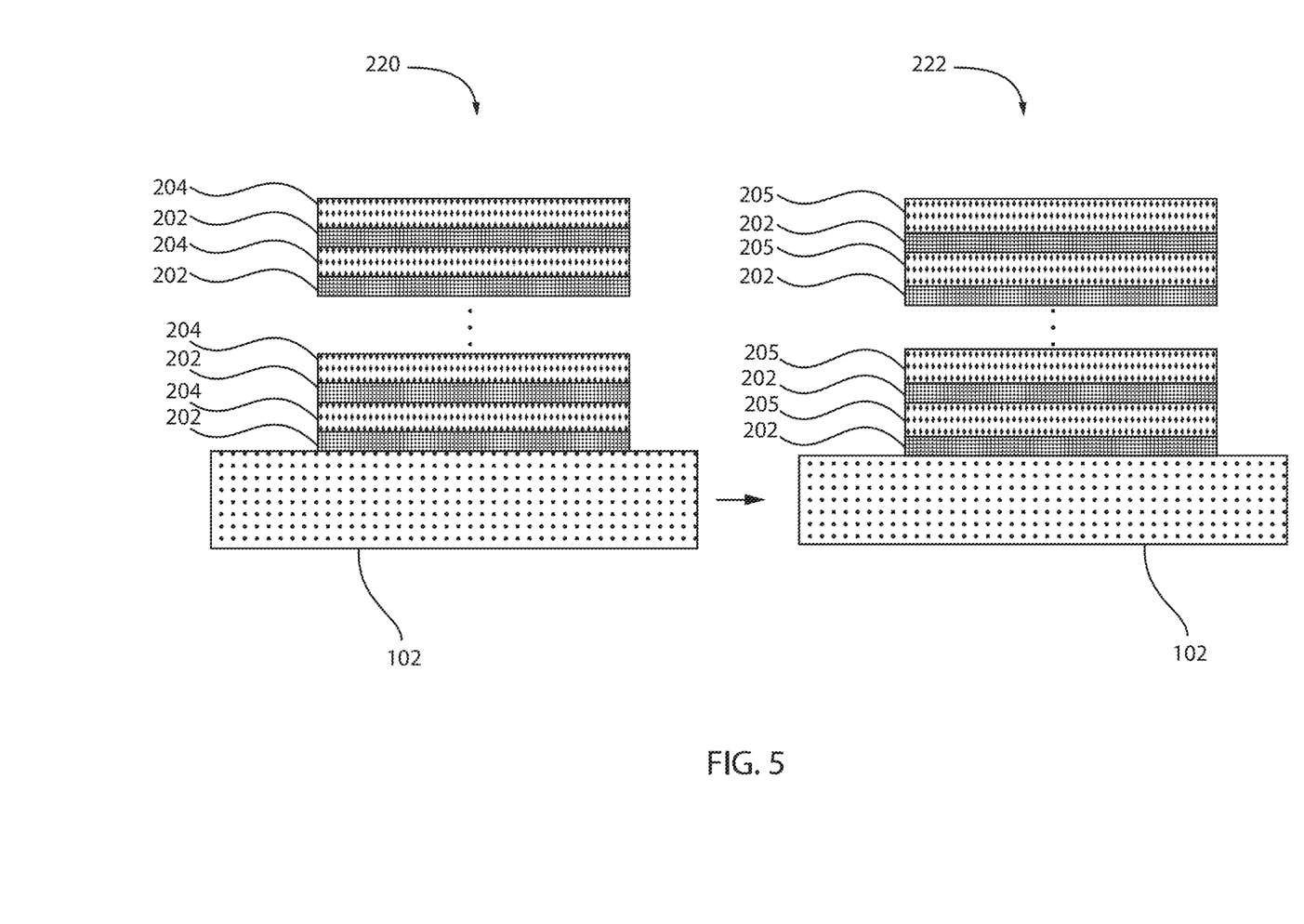
FIG. 5 is a cross-sectional schematic view of the partially fabricated battery anode showing the base material processed thereby increasing its volume which is compensated for by the conductive layers in accordance with the present principles.

Referring to FIG. 5, stacked multi-layers of the base material (e.g., amorphous silicon (a-Si)) 204 and compressible layers (e.g., carbon nanotubes (CNT)) 202 for a lithium ion battery anode application are illustratively shown. A first structure 220 shows a volume of the base material 204 (e.g., silicon) prior to processing (e.g., lithiation). A second structure 222 shows the volume after processing (e.g., lithiation) to form an active material 205. The silicon volume increases due to lithium insertion. The lithiation volume increase is balanced by a volume decrease (compression) of the CNT interlayers 202. The stacked layers are to be kept thin enough to permit lithium to diffuse and be captured in internal layers to increase the capacity of the battery. The stress/strain due to the volume increase is stress/strain relieved by the CNT layers 202. The thin film silicon containing layer 204 volume increase due to $Li^+$ insertion is balanced by a compression of the bundle 202 to protect from silicon pulverization. While silicon is described for layers 205 and CNTs are described for layers 202, it should be understood that other materials for layers 202 and 205 may be employed as described above.

The present principles provide a low probability of silicon fracture due to volume increase, which can be balanced by the volume decrease (compression) of the columns or internal layers made of thin wires or tubes (spongy materials). In addition, amorphous silicon has less packing density than crystalline silicon, which may be used to build the silicon nanowires, and hence tolerate more compressive stresses than crystalline silicon. Larger contact area also exists between the active material (lithium silicon compound) and a conductive electrode than in the case of complete silicon wires.

The present principles may be applied to different structures and applications. For example, flexible electrodes may be constructed as thin flexible conductive sheets including the active material and volume compensating materials. In addition, while the present structures may be employed with Li anode batteries, other materials may also be employed. In particular, materials that expand during a chemical reaction may be compensated for using volumes or bundles of tubes or other spongy materials as described in accordance with the present principles.

Conventional vertically aligned carbon nanotube electrodes enable ~800 mAh/g. The present embodiments provide a larger and optimizable area of contact with lithium and provide the availability of silicon which displays the highest theoretical capacity of 4212 mAh/g. The horizontally stacked (laminated) layers have the advantage of being simple to implement because no patterning is needed.

Crystalline silicon is transformed to amorphous silicon after de-lithiation (battery charging). In the present embodiments, amorphous silicon is employed from the beginning, which saves the cost of using much more expensive crystalline silicon. In addition, the changes in a first cycle resulting from amorphization are avoided. Amorphous silicon has a larger volume than crystalline silicon due to its lower packing density, which makes starting with amorphous silicon more attractive than starting with packed crystalline silicon. This also leads to less of a volume increase as crystalline silicon undergoes a volume increase due to both lithiation and amorphization.

Figure 6:
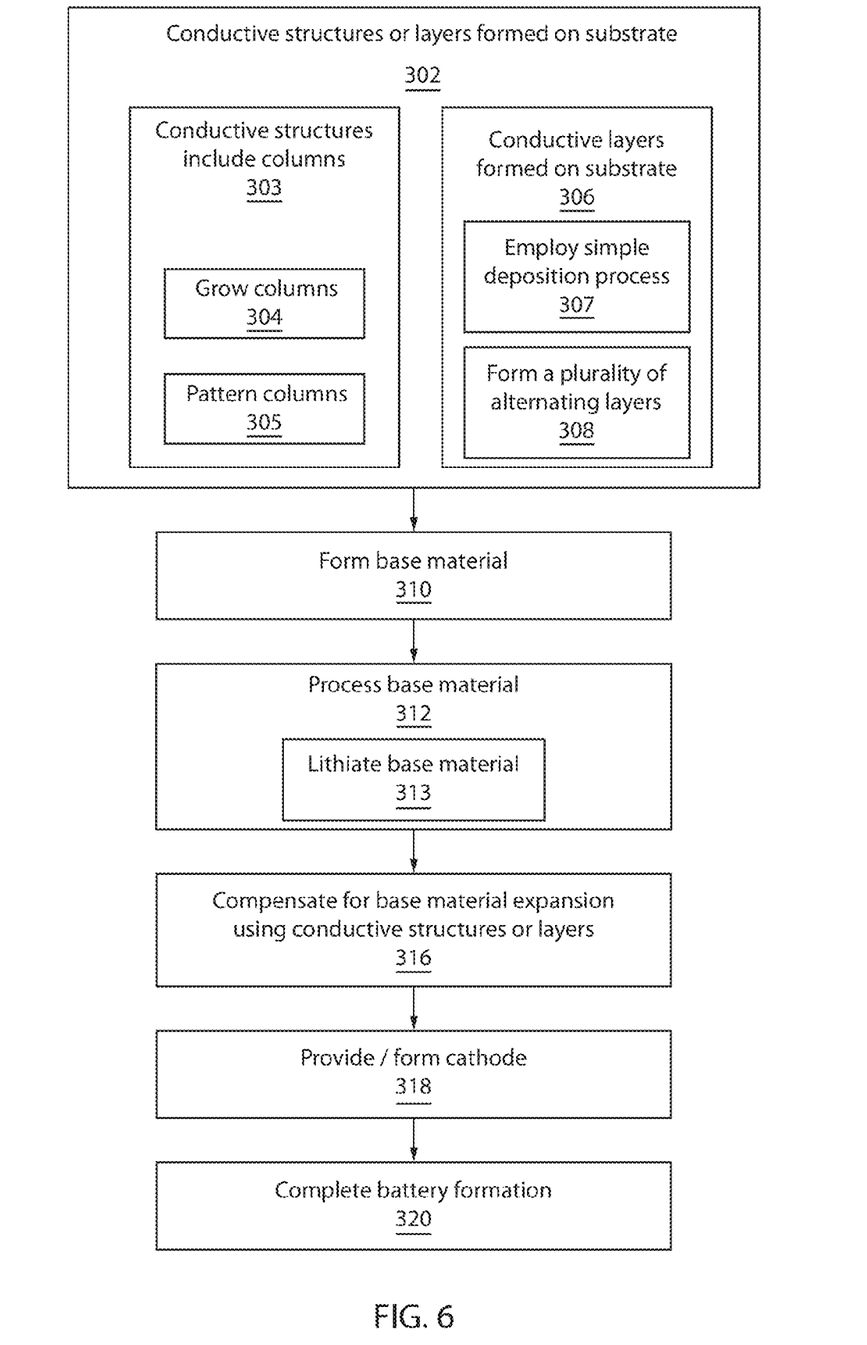
FIG. 6 is a block/flow diagram showing methods for forming a battery anode in accordance with illustrative embodiments.

Referring to FIG. 6, a method for fabricating a battery electrode is illustratively depicted. For FIG. 6, the functions noted in the blocks may occur out of the order noted. For example, two blocks shown in succession may, in fact, be executed substantially concurrently, or the blocks may sometimes be executed in the reverse order, depending upon the functionality involved. In block 302, conductive structures or layers are formed on a conductive substrate. The conductive substrate preferably includes a metal, such as Al or Cu, although other conductive materials may be employed. The conductive structures may be formed from a compressible matrix of material or treated to be elastically compressive (e.g., voids formed in metal, etc.). In block 303, the conductive structures include vertical structures or columns. This may include one or more tubes (e.g., metal), bundles of wires (e.g., metal nanowires), bundles of carbon nanotubes, even a solid matrix having voids or gas pockets may be employed. In block 304, the conductive structures may be grown from the conductive substrate to form columns. This may be performed using an epitaxial growth process to grow wires at seed sites on the substrate. In block 305, the conductive structures may be formed using a mask over the conductive substrate and etching the conductive structures in the substrate to form the columns. The mask may be created using a plurality of methods including, forming solder balls, using a copolymer process, using an Al oxide pattern, using lithography, etc.

In block 306, in another embodiment, one or more conductive layers are formed on the conductive substrate. The conductive layer is formed from a compressible matrix of material. The conductive layer(s) includes horizontal structures. This may include one or more tubes (e.g., metal), bundles of wires (e.g., metal nanowires), bundles of carbon nanotubes, even a solid matrix having voids or gas pockets may be employed. In block 307, the conductive layer may be formed by a simple deposition process, such as, e.g., dip coating, spraying, vacuum filtering, etc. In block 308, alternating layers of the conductive layer and base material may be formed to create a stack of layers and further increase surface area.

In block 310, a base material is formed on the conductive structures or layer(s). The base material may include a silicon containing material having additional elements or compounds included therein.

In block 312, the base material is processed to form an active material on the conductive structures such that the amorphous base material undergoes a volumetric expansion during the processing. The active material may include lithiated amorphous silicon by lithiating the amorphous silicon in block 313. Other materials may also be employed. In block 316, the volumetric expansion is compensated for using the matrix of compressible material provided by the conductive structures or layers. In one embodiment, a battery electrode including an anode is provided. In block 318, a cathode is provided or formed. In block 320, an electrolyte and other components are provided to complete the formation of a battery which includes compensation for volumetric expansion on an anode material in the battery.

Having described preferred embodiments for a composite anode structure for high energy density lithium-ion batteries (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A battery electrode, comprising:
a conductive substrate;
a first conductive compressible layer disposed directly on the conductive substrate, wherein the first conductive compressible layer is parallel to a major plane of the conductive substrate, and comprises a plurality of conductive threads;
a first active material layer disposed over the first conductive compressible layer, wherein the first active material layer is parallel to the major plane of the conductive substrate; and
a second conductive compressible layer comprising a plurality of conductive threads disposed on the first active material layer,
wherein the first active material layer is between the first and second compressible layers to form an alternating horizontal layer pattern over and parallel to the major plane of the conductive substrate, wherein the active material layer includes a volumetrically expanding material, and the first and second compressible layers provide support for the active material and compensate for volumetric expansion of the active material such that damage to the active material is prevented.

2. The electrode as recited in claim 1, wherein the conductive substrate and the conductive threads comprise a metal.

3. The electrode as recited in claim 1, wherein the conductive threads comprise metal wires and carbon nanotubes.

4. The electrode as recited in claim 1, wherein the active material includes lithiated silicon.

5. The electrode as recited in claim 4, wherein the lithiated silicon includes amorphous silicon.

6. The electrode as recited in claim 1, wherein the electrode includes a battery anode.

7. The electrode as recited in claim 1, wherein the conductive threads comprise porous silicon.

8. The electrode as recited in claim 1, wherein the plurality of conductive compressible layers and the plurality of active material layers are formed by at least one of dip coating, spraying or vacuum filtering.

9. The electrode as recited in claim 1, wherein the plurality of conductive layers and the plurality of active material layers are arranged in non-transverse orientations over and parallel to the main plane of the conductive substrate.

10. A method for forming a battery electrode, comprising:
forming an alternating horizontal layer pattern, comprising a plurality of conductive compressible layers alternating with a plurality of base layers, the pattern being disposed over, and parallel to, a major plane of a conductive substrate, each of the plurality of conductive compressible layers comprising a respective plurality of conductive threads;

processing the plurality of base layers to form an active material such that the plurality of base layers undergoes a volumetric expansion; and compensating for the volumetric expansion using the plurality of conductive compressible layers such that damage to the active material is prevented, wherein the conductive substrate and the conductive threads are formed of a same material.

11. The method as recited in claim 10, wherein the conductive substrate includes a metal.

12. The method as recited in claim 10, wherein the conductive threads comprise metal wires and carbon nanotubes.

13. The method as recited in claim 10, wherein forming conductive threads includes depositing the conductive threads to form layers.

14. The method as recited in claim 10, wherein the active material includes lithiated silicon.

15. The method as recited in claim 10, wherein the base material includes amorphous silicon and processing the base material includes lithiating the amorphous silicon to form lithiated silicon.

16. The method as recited in claim 10, wherein the battery electrode includes an anode.

17. The method as recited in claim 10, wherein the conductive threads comprise porous silicon.

18. The method as recited in claim 10, wherein the plurality of conductive layers and the plurality of active material layers are formed in non-transverse orientations over and parallel to the main plane of the conductive substrate.

19. A battery electrode, comprising:
a conductive substrate;
an alternating horizontal layer pattern comprising a plurality of conductive compressible layers alternating with a plurality of base layers, the pattern being disposed over, and parallel to, a major plane of the conductive substrate, each of the plurality of conductive compressible layers comprising a respective plurality of conductive threads, each of the plurality of base layers comprising an active material, the active material including a volumetrically expanding material which expands during diffusion by ions such that the plurality of conductive threads provides support for the active material and compensates for volumetric expansion of the active material such that damage to the active material is prevented.

20. The electrode as recited in claim 19, wherein the conductive substrate and the conductive threads comprise a metal.

21. The electrode as recited in claim 19, wherein the plurality of conductive compressible layers comprises bundles of metal wires and carbon nanotubes.

22. The electrode as recited in claim 19, wherein the plurality of conductive compressive layers and the plurality of base layers are formed by at least one of dip coating, spraying or vacuum filtering.

23. The electrode as recited in claim 19, wherein the active material includes lithiated silicon.

24. The electrode as recited in claim 19, wherein the base material includes amorphous silicon and processing the base material includes lithiating the amorphous silicon to form lithiated silicon.

25. The electrode as recited in claim 19, wherein the conductive threads comprise porous silicon.

26. The electrode as recited in claim 19, wherein each of the plurality of conductive compressible layers comprises a respective plurality of conductive threads that provides support for the active material and compensates for the volumetric expansion of the active material such that damage to the active material is prevented.

27. The electrode as recited in claim 19, wherein each of the plurality of conductive compressible layers comprises a respective conductive solid having voids, the respective solid providing support for the active material and the voids compensating for the volumetric expansion of the active material such that damage to the active material is prevented.

28. The electrode as recited in claim 19, wherein the plurality of conductive layers and the plurality of base layers are arranged in non-transverse orientations over and parallel to the main plane of the conductive substrate.

* * * * *